Figure 1:
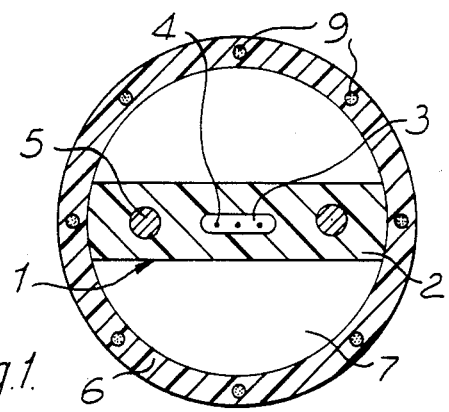

United States Patent [19]

Dean et al.

[11] 4,195,906
[45] Apr. 1, 1980

[54] OPTICAL GUIDES

[75] Inventors: Noel S. Dean, Wigan; Frank Lea, St. Helens, both of England

[73] Assignee: BICC Limited, London, England

[21] Appl. No.: 892,913

[22] Filed: Apr. 3, 1978

[30] Foreign Application Priority Data

Apr. 13, 1977 [GB] United Kingdom ............... 15273/77

[51] Int. Cl.² ................................................ G02B 5/16
[52] U.S. Cl. .................................................. 350/96.23
[58] Field of Search ..................................... 350/96.23

[56] References Cited

U.S. PATENT DOCUMENTS

| 3,955,878 | 5/1976 | Nowak | 350/96.23 |
| 4,110,001 | 8/1978 | Olszewski et al. | 350/96.23 |

FOREIGN PATENT DOCUMENTS

| 2635917 | 2/1978 | Fed. Rep. of Germany | 350/96.23 |
| 2300348 | 9/1976 | France | 350/96.23 |
| 1479426 | 7/1977 | United Kingdom | 350/96.23 |
| 1480206 | 7/1977 | United Kingdom | 350/96.23 |

*Primary Examiner*—Stewart J. Levy
*Attorney, Agent, or Firm*—Buell, Blenko & Ziesenheim

[57] ABSTRACT

An optical cable comprises at least one optical cable element and, surrounding the optical cable element or elements, a flexible tube of rubber or plastics material, the bore of the tube being of such a transverse cross-section having regard to the transverse cross-section of the optical cable element or to the transverse cross-sections of the optical cable elements that there is at least one elongate space formed between the element or elements and the internal surface of the tube. The or each optical cable element comprises an extruded elongate body of rubber or plastics material having a transverse cross sectional shape of elongate form and having at least one bore extending lengthwise in the body, at least one optical bundle and/or at least one separate optical fiber housed loosely in the bore or in at least one of the bores and, embedded in said extruded elongate body and arranged side-by-side with said bore or bores, at least two separate elongate reinforcing members, the or each bore being positioned between two reinforcing members.

16 Claims, 3 Drawing Figures

OPTICAL GUIDES

This invention relates to optical guides for the transmission of the ultra violet, visible and infra-red regions of the electromagnetic spectrum, which regions, for convenience, will hereinafter all be included in the generic term "light" and especially, but not exclusively, to optical waveguides for use in the communications field adapted for transmission of light having a wavelength within the range 0.8 to 1.3 micrometers.

According to the present invention, an optical cable comprises at least one optical cable element comprising an extruded elongate body of rubber or plastics material having a transverse cross sectional shape of elongate form and having at least one bore extending lengthwise in the body, at least one flexible optical guide housed loosely in the bore or in at least one of the bores and, embedded in said extruded elongate body and arranged side-by-side with said bore or bores, at least two separate elongate reinforcing members, the or each bore being positioned between two reinforcing members; and, surrounding the optical cable element or elements, a flexible tube of rubber or plastics material, the bore of the tube being of such a transverse cross-section having regard to the transverse cross-section of the optical cable element or to the transverse cross-sections of the optical cable elements that there is at least one elongate space formed between the element or elements and the internal surface of the tube.

The or each flexible optical guide of the or an optical cable element may be a separate optical fibre or it may be an optical bundle. By the expression "optical bundle" is meant a group of optical fibres or a group of fibres including one or more optical fibres and one or more non-optical reinforcing fibres or other reinforcing elongate elements. Each optical fibre and/or non-optical fibre may be of circular or non-circular cross-section.

By virtue of being housed loosely in a bore extending lengthwise in the extruded elongate body, limited relative movement between the or each optical bundle and/or between the or each separate optical fibre and the extruded elongate body can take place when the cable is flexed.

The elongate space or spaces within the flexible tube may contain at least one elongate electric conductor, which may or may not be insulated, and/or may be substantially filled throughout the length of the cable with a greasy, water-impermeable medium. A preferred filling medium consists of, or comprises as a major constituent, petroleum jelly.

Where, as is preferred, the axes of the bore or bores and the reinforcing members in the elongate body of the element lie in a common plane, preferably the opposite major surfaces of the element lie in substantially parallel planes. In this latter case, the bore of the flexible tube is preferably of substantially circular cross-section.

Preferably, the or each optical cable element is housed loosely in the flexible tube but, where the tube contains a single optical cable element having a transverse cross-section of elongate form, the opposite minor surfaces of the elongate body of the element may be bonded to or integral with the internal surface of the tube to form two elongate spaces on opposite sides of the element.

The internal surface of the flexible tube may be lined with a moisture barrier in the form of a continuous layer of tape of metal or metal alloy, at least the outwardly facing surface of the or each tape carrying a layer of plastics material which is bonded to the flexible tube. Where it is desired that the minor surfaces of the elongate body of a single optical cable element are bonded to the flexible tube, the inwardly facing surface of the or each tape may carry a layer of plastics material which is bonded to the minor surfaces of said elongate body.

The flexible tube may be surrounded by an oversheath of extruded rubber or plastics material and, in this case, preferably the flexible tube and oversheath are separated by a moisture barrier in the form of a continuous layer of tape of metal or metal alloy, one or each surface of the tape preferably carrying a layer of plastics material which is bonded to the flexible tube or oversheath, as the case may be.

A reinforcing wall comprising at least one layer comprising one or more than one elongate element of reinforcing material may be wholly or partially embedded in or may surround the flexible tube housing the optical cable element or elements. Where an oversheath is provided the reinforcing wall may be wholly or partially embedded in the oversheath.

The elongate element or elongate elements of reinforcing material may extend helically about the axis of the flexible tube or they may extend lengthwise of, and preferably substantially parallel to, the axis of the tube. Where the reinforcing elongate element or elongate elements of the reinforcing wall extend helically about the flexible tube, preferably the reinforcing wall comprises at least two layers of elongate elements of reinforcing material extending helically about the tube, the direction of lay of adjacent layers being of opposite hand. The helically extending elongate elements of adjacent layers may be interwoven to form a braided sleeve of reinforcing material.

Preferably, some or all of the elongate elements of reinforcing material are embedded at spaced positions around the flexible tube or oversheath and extend substantially lengthwise of the cable and each may have, in the element, undulations, preferably radially extending undulations, that serve to improve the mechanical bonding of the element within the flexible tube or oversheath and the flexibility of the cable.

The elongate elements of reinforcing material having undulations therein may each comprise a single wire or a plurality of wires stranded together, the wire or strand being crimped at spaced positions along its length to form undulations but, with a view to maintaining the weight of the cable as low as possible, preferably each of these elongate reinforcing elements comprises a bunch of compacted yarns of glass fibre or other inorganic reinforcing material.

Where the undulating elongate reinforcing elements are bunches of compacted yarns of glass fibre or other inorganic reinforcing material, preferably these yarns are not pre-impregnared with an agent for binding to the material of the flexible tube or oversheath and preferably, also, there is substantially no air in the interstices between the elementary filaments of the bunch. Each bunch may consist of elements of glass fibre or of other inorganic material of the same kind and/or thickness or it may consist of a combination of elements of different kinds from one another, for example single or doubled yarns, and/or of different thicknesses from one another.

Figure 2:
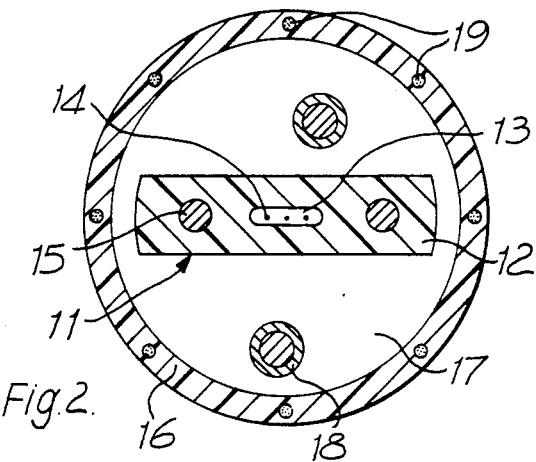
Figure 3:
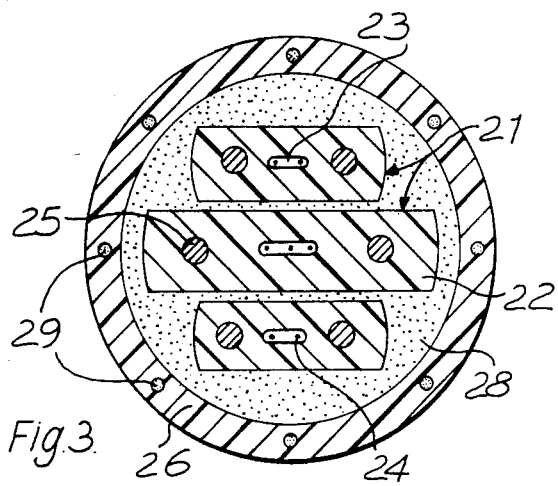

The invention is further illustrated by a description, by way of example, of three preferred forms of optical cable with reference to the accompanying drawing wherein FIGS. 1-3 show diagrammatic transverse cross-sectional views of the three cables.

Referring to FIG. 1, the optical cable comprises a single optical cable element 1 consisting of an extruded elongate body 2 of plastics material having a central bore 3 and, extending alongside and on opposite sides of the bore, two reinforcing wires 5, the axes of the bore and reinforcing wires lying in a common plane. Housed loosely in the bore 3 are optical fibres 4. The optical cable element is surrounded by a flexible tube 6 of plastics material with the minor surfaces of the elongate body 2 bonded to the internal surface of the tube to form elongate spaces 7 on opposite sides of the element. Embedded in the flexible tube 6 at circumferentially spaced positions are elongate reinforcing members 9, each comprising a bunch of compacted yarns of glass fibre having, in the bunch, radially extending undulations that serve to improve the mechanical bonding of the bunch within the tube and the flexibility of the cable.

The optical cable shown in FIG. 2 comprises a single optical cable element 11 housed loosely in a flexible tube 16 of plastics material. The optical cable element 11 consists of an extruded elongate body 12 having a bore 13 in which optical fibres 14 are loosely housed and, on opposite sides of the bore, two reinforcing wires 15, the axes of the bore and reinforcing wires lying in a common plane. Housed loosely in elongate spaces 17 on opposite sides of the optical cable element 11 are two insulated conductors 18. Elongate reinforcing members 19 are embedded in the flexible tube 16 at circumferentially spaced positions, each member comprising a bunch of compacted yarns of glass fibre having, in the bunch, radially extending undulations.

The optical cable shown in FIG. 3 comprises three optical cable elements 21 housed loosely in a flexible tube 26 of plastics material. Each optical cable element 21 consists of an extruded elongate body 22 having a bore 23 in which optical fibres 24 are loosely housed and, on opposite sides of the bore, two reinforcing wires 25, the axes of the bore and reinforcing wires lying in a common plane. Elongate spaces between the optical cable elements 21 and the internal surface of the tube 26 are filled with petroleum jelly 28. At circumferentially spaced positions around the tube 26, elongate reinforcing members 29 are embedded, each member comprising a bunch of compacted yarns of glass fibre having, in the bunch, radially extending undulations.

What we claim as our invention is:

1. An optical cable comprising at least optical cable element comprising an extruded elongate body of rubber or plastics material having a transverse cross sectional shape of elongate form and having at least one bore extending lengthwise in the body, at least one flexible optical guide housed loosely in the bore or in at least one of the bores and, embedded in said extruded elongate body and arranged side-by-side with said bore or bores, at least two separate elongate reinforcing members, the at least one bore being positioned between two reinforcing members; and, surrounding the optical cable element or elements, a flexible tube from one of the group consisting of rubber and plastics material, the bore of the tube being of such a transverse cross section having regard to the transverse cross section of the optical cable element or to the transverse cross section of the optical cable elements that there is at least one elongate space formed between the at least one element and the internal surface of the tube.

2. An optical cable comprising at least one optical cable element comprising an extruded body of rubber or plastics material having a transverse cross sectional shape of elongate form and having at least one bore extending lengthwise in the body, at least one flexible optical guide housed loosely in the bore or in at least one of the bores and, embedded in said extruded elongate body and arranged side-by-side with said bore or bores, at least two separate elongate reinforcing members, the at least one bore being positioned between two reinforcing members and the axes of the bore or bores and the reinforcing members lying in a common plane; and, surrounding the at least one optical cable element, a flexible tube of one of the group consisting of rubber and plastics material, the bore of the tube being of such a transverse cross section having regard to the transverse cross section of the optical cable element or to the transverse cross sections of the optical cable elements that there is at least one elongate space formed between the at least one element and the internal surface of the tube.

3. An optical cable as claimed in claim 2, wherein the opposite major surfaces of the or each optical cable element lie in substantially parallel planes.

4. An optical cable as claimed in claim 1, wherein the flexible optical guide or at least one of the flexible optical guides of the or each optical cable element is a separate optical fibre.

5. An optical cable as claimed in claim 1, wherein the flexible optical guide or at least one of the flexible optical guides of the or each optical cable element is an optical bundle.

6. An optical cable as claimed in claim 1, wherein the or each optical cable element is housed loosely in the flexible tube.

7. An optical cable as claimed in claim 1, in which the flexible tube contains a single optical cable element, wherein the opposite minor surfaces of the elongate body of the element are integral with the internal surface of the tube to form two elongate spaces on opposite sides of the element.

8. An optical cable as claimed in claim 1, wherein the bore of the flexible tube is of substantially circular cross-section.

9. An optical cable as claimed in claim 1, wherein at least one elongate electric conductor is contained in the elongate space or in at least one of the elongate spaces.

10. An optical cable as claimed in claim 1, wherein the or each elongate space is substantially filled throughout the length of the cable with a greasy, water-impermeable medium.

11. An optical cable as claimed in claim 1, wherein the internal surface of the flexible tube is lined with a moisture barrier in the form of a continuous layer of metal tape, at least the outwardly facing surface of the tape carrying a layer of plastics material which is bonded to the flexible tube.

12. An optical cable as claimed in claim 1, wherein the flexible tube is surrounded by an oversheath of extruded rubber or plastics material.

13. An optical cable as claimed in claim 12, wherein the flexible tube and oversheath are separated by a moisture barrier in the form of a continuous layer of metal tape, each surface of the tape carrying a layer of plastics material which is bonded to the flexible tube or oversheath, as the case may be.

14. An optical cable as claimed in claim 1, wherein a reinforcing wall comprising at least one layer of elongate elements of reinforcing material is embedded in the flexible tube.

15. An optical cable as claimed in claim 14, wherein the elongate elements of reinforcing material extend helically about the axis of the flexible tube.

16. An optical cable as claimed in claim 14, wherein at least some of the elongate elements of reinforcing material are embedded at spaced positions around the flexible tube and extend substantially lengthwise of the cable, each elongate element having undulations that serve to improve the mechanical bonding of the element within the flexible tube and the flexibility of the cable.

* * * * *